Oct. 11, 1960  R. L. BRINDLEY  2,955,874
SELF-SUPPORTING SEPARABLE BOWS FOR TRAILER BODY COVERS
Filed April 30, 1959
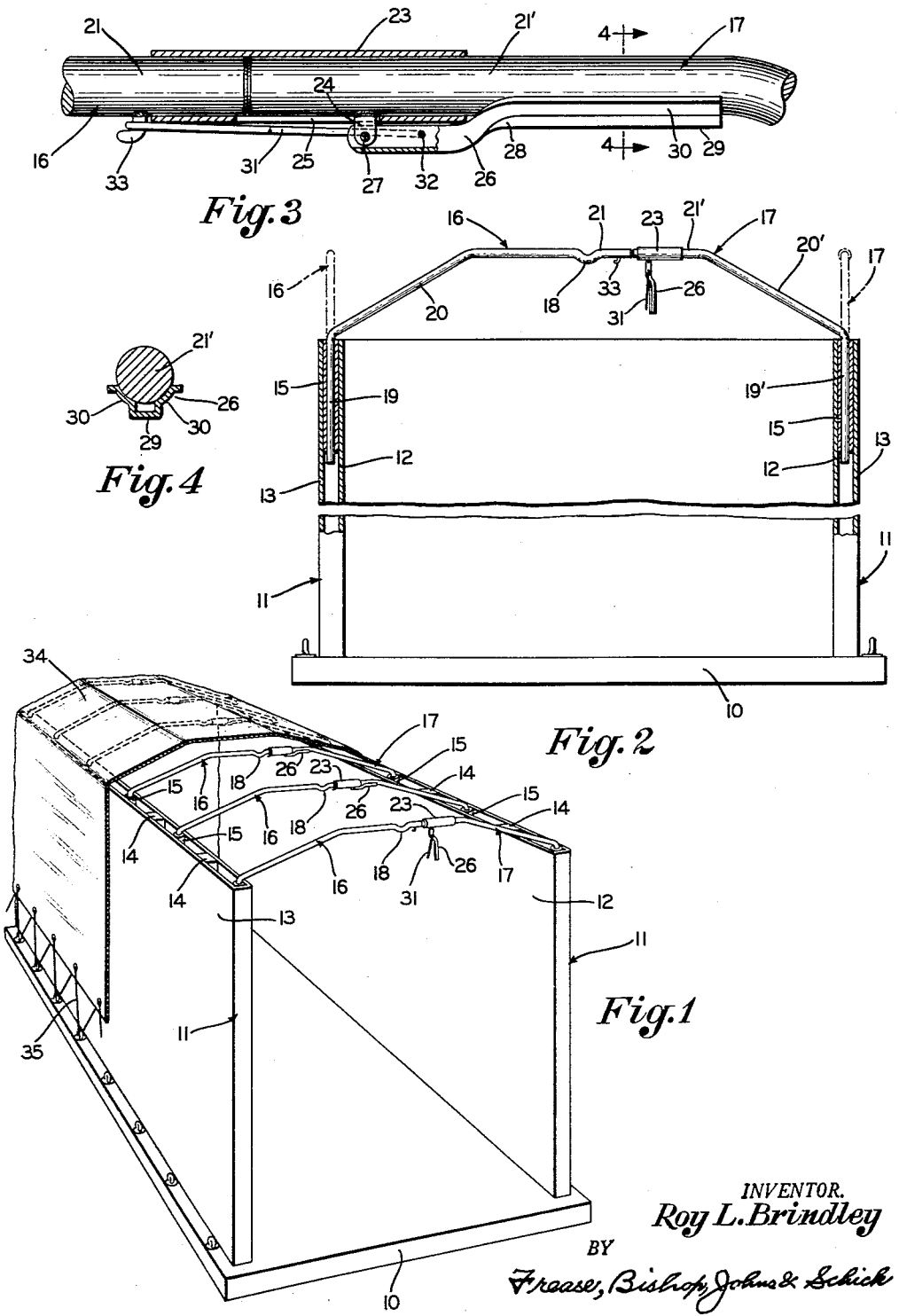
INVENTOR.
Roy L. Brindley
BY
Frease, Bishop, Johns & Schick
ATTORNEYS United States Patent Office 2,955,874
Patented Oct. 11, 1960

2,955,874

SELF-SUPPORTING SEPARABLE BOWS FOR TRAILER BODY COVERS

Roy L. Brindley, 1615 Dover Ave., Dover, Ohio

Filed Apr. 30, 1959, Ser. No. 810,006

2 Claims. (Cl. 296—104)

The invention relates to bows for supporting the cover of a trailer or truck body, and more particularly to separable bows swivelled or hingedly mounted upon the body of the trailer or truck.

It is common practice to provide upon trailer bodies, water-proof tarpaulin covers which are supported upon a frame comprising a series of inverted U-shaped bows or frame members. These bows are commonly formed as integral structural members bent into a U-shape and supported in the inverted position on the side walls of the open body of the trailer.

A ridge pole or rope is commonly provided, extending longitudinally of the trailer body across the bows. A tarpaulin or canvas cover is stretched over this framework and tied down. When it is desired to load or unload the trailer body through the open top thereof, it is necessary that the tarpaulin or canvas cover be removed from the supporting frame and that the U-shaped bows be disconnected from the trailer body so as to leave the open top thereof unobstructed.

This is a tedious, time and labor-consuming operation. One bow at a time must be removed by hammering or pounding the same upwardly to withdraw the depending legs of the U-shaped bows from the sockets on the trailer body into which they are received.

The present invention contemplates the provision of separable bows, each formed of two sections swivelled or hingedly connected to the trailer body, with means carried upon one section of each bow for engagement with the other section thereof for detachably securing the two sections of the bow together.

Another object of the invention is to provide a separable bow construction of the character referred to in which a sleeve is slidably mounted upon the inner end of one section of each bow and adapted to be slidably engaged over the inner end of the other section of the bow, with cooperating means upon the sleeve and said other section for locking the sleeve in position to connect the two sections of the bow together.

A further object of the invention is to provide such a separable bow construction in which a lever is fulcrumed upon one section of the bow and a link is pivotally connected to the lever and adapted to engage a lug or hook on the other section of the bow for locking the sleeve in position to connect the two bow sections together.

The above objects together with others which will be apparent from the drawing and following description, or which may be later referred to, may be attained by constructing the improved separable bow construction in the manner hereinafter described in detail and illustrated in the accompanying drawing, in which;

Fig. 1 is a perspective view of a portion of a trailer body showing the separable bows mounted thereon for supporting a tarpaulin or canvas cover;

Fig. 2 is a transverse sectional view through a trailer body showing one pair of the separable bow sections thereon in position to be detachably connected together;

Fig. 3 is an enlarged fragmentary sectional elevation of the meeting end portions of the two sections of a bow showing the sliding sleeve locked thereon to attach the two bow sections together; and Fig. 4 is a transverse section on the line 4—4, Fig. 3.

A conventional trailer body is shown in Figs. 1 and 2, comprising the bottom wall 10 and the side walls indicated generally at 11. As in usual practice, the side walls 11 may be formed of inner and outer metal sheets 12 and 13 respectively, connected to opposite sides of the vertical posts 14. Tubular sockets 15 are mounted within the hollow side walls 11 at the upper ends thereof, as shown in Figs. 1 and 2.

Each of the separable bows to which the invention pertains comprises two mating sections indicated generally at 16 and 17. Each of these sections may be of the same size and shape as the other section of the bow. However, in cases where it is desirable to provide the conventional rope loops in the bows for stretching a ridge rope therethrough, the section 16 may be of somewhat greater length than the section 17 so as to form a rope loop 18 in each of the sections 16, said rope loops being located at the longitudinal center of the trailer body.

Each bow section 16 comprises the depending vertical leg 19, which is swivelled or hingedly mounted within the corresponding tubular socket 15, the upwardly and inwardly inclined portion 20 and the horizontal terminal portion 21 extending beyond the longitudinal center of the trailer body and having the rope loop 18 formed therein.

Each bow section 17 comprises the depending vertical leg 19' swivelled or hingedly mounted within the corresponding tubular socket 15, the upwardly and inwardly inclined portion 20' and the horizontal terminal portion 21' adapted to abut the terminal end of the corresponding bow section 16, as best shown in Figs. 2 and 3.

With this construction, when the bow sections 16 and 17 are disconnected from each other, each bow section may be swung outward away from the open top of the trailer body to the broken line position indicated in Fig. 2, the depending vertical legs 19 and 19' thereof swiveling or rotating within the tubular sockets 15.

For the purpose of detachably connecting the meetings ends of the bow sections 16 and 17 together, a tubular sleeve 23 is slidably mounted upon the horizontal terminal end portion 21' of each section 17. This sleeve is prevented from becoming accidentally disengaged from the bow section 17 by means of the depending lug 24 on the bow section located through the elongated slot 25 in the underside of the sleeve.

Thus, the sleeve is not only prevented from being disengaged from the bow section 17, but the movement of the sleeve in each direction is limited thereby.

A clamping lever 26 is fulcrumed upon the lug 24, as indicated at 27. The outer end of this lever is offset upwardly as at 28 and may be of the cross-sectional shape best shown in Fig. 4, comprising the central channel portion 29 and the arcuate portions 30 adapted to conform to the contour of the terminal end portion 21' of the section 17.

A link 31 is pivotally connected to the lever 26, at a point spaced from the fulcrum thereof, as indicated at 32. When the sleeve 23 is in the unlatched position, as shown in Fig. 2, the lever 26 and link 31 will be suspended downwardly therefrom.

In order to lock the bow section 16 and 17 together, the sleeve 23 is slidably moved to the position shown in Fig. 3, engaging over the terminal end 21 of the bow section 16. The free end of the link 31 is then engaged over the depending hook 33 on the bow section 16 and the lever 26 is swung backward and upward against the horizontal portion 21' of the bow section 17, as shown in Fig. 3. It will be seen that in this position the link 31 is moved over the center of the fulcrum 27 so as to lock the parts in this position, and the offset portion 28 of the lever is positioned at the adjacent end of the sleeve 23 to prevent backward movement of the sleeve.

With the bow sections thus locked together, a ridge rope may be stretched through the rope loops 18 of the bows in conventional manner and secured at each end of the trailer body, providing additional support for the tarpaulin or canvas cover 34 which may then be stretched over the frame thus formed and tied down in conventional manner, as indicated at 35.

When it is desired to load or unload the trailer body from the top, the tarpaulin cover 34 is untied and removed, and if a ridge rope is provided, the same should be disconnected. The levers 26 are then swung downward disengaging the links 31 from the hooks 33. The sliding sleeves 23 are then slidably moved backward to disengage the same from the terminal ends 21 of the bow sections 16.

With the parts then in the position shown in full lines in Fig. 2, each bow section may be swung outward to the broken line position to clear the open top of the trailer body so that the same may be top-loaded or unloaded.

If necessary, a screw driver or other tool may be inserted into the channel portion 29 of the lever 26 in order to swing the lever down into position where the link 31 will pass downward over the center 27, permitting the lever and link to swing downward by gravity after which the sliding sleeve 23 is disengaged as above described.

From the above it will be obvious that a simple, inexpensive and readily-operated device is provided for removing the supporting bows from over the open top of a trailer body, thus eliminating the time and labor-consuming operation involved with removing the conventional one-piece bows to permit top-loading or unloading.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction and reasonable mechanical equivalents thereof obvious to those skilled in the art, are set forth in the appended claims.

I claim:

1. A vehicle body frame comprising pairs of upright socket members, separable bows each comprising two substantially similar sections, each bow section comprising a depending vertical leg swivelled within one of said socket members and a horizontal terminal portion, means for detachably connecting said bow sections together, said means comprising a tubular sleeve slidably mounted upon the horizontal terminal portion of one bow section for sliding engagement over the horizontal terminal portion of the other bow section, and means for detachably locking said sleeve in position, said last-named means comprising a lever fulcrumed upon said one section of the bow, a link pivotally mounted upon said lever and a hook upon said other section of the bow for engagement by said link, whereby said bow sections may be disconnected and swung away from each other.

2. A vehicle body frame comprising pairs of upright socket members, separable bows each comprising two substantially similar sections, each bow section comprising a depending vertical leg swivelled within one of said socket members and a horizontal terminal portion, means for detachably connecting said bow sections together, said means comprising a tubular sleeve slidably mounted upon the horizontal terminal portion of one bow section for sliding engagement over the horizontal terminal portion of the other bow section, and means for detachably locking said sleeve in position, said last-named means comprising a lever fulcrumed upon said one section of the bow, an offset portion on said lever for contact with the adjacent end of the sleeve, a link pivotally mounted upon said lever and a hook upon said other section of the bow for engagement by said link, whereby said bow sections may be disconnected and swung away from each other.

References Cited in the file of this patent

UNITED STATES PATENTS

| | | |
|---|---|---|
| 2,080,762 | Crawford | May 18, 1937 |
| 2,774,623 | Owen | Dec. 18, 1956 |

FOREIGN PATENTS

| | | |
|---|---|---|
| 439,609 | Great Britain | Dec. 10, 1935 |